Sept. 19, 1967                   L. J. DOWD                   3,342,417
SELF-PROPELLED IRRIGATION SYSTEM OF THE CABLE
TYPE USING ELECTRIC MOTORS
Filed Aug. 6, 1965                                         4 Sheets-Sheet 3

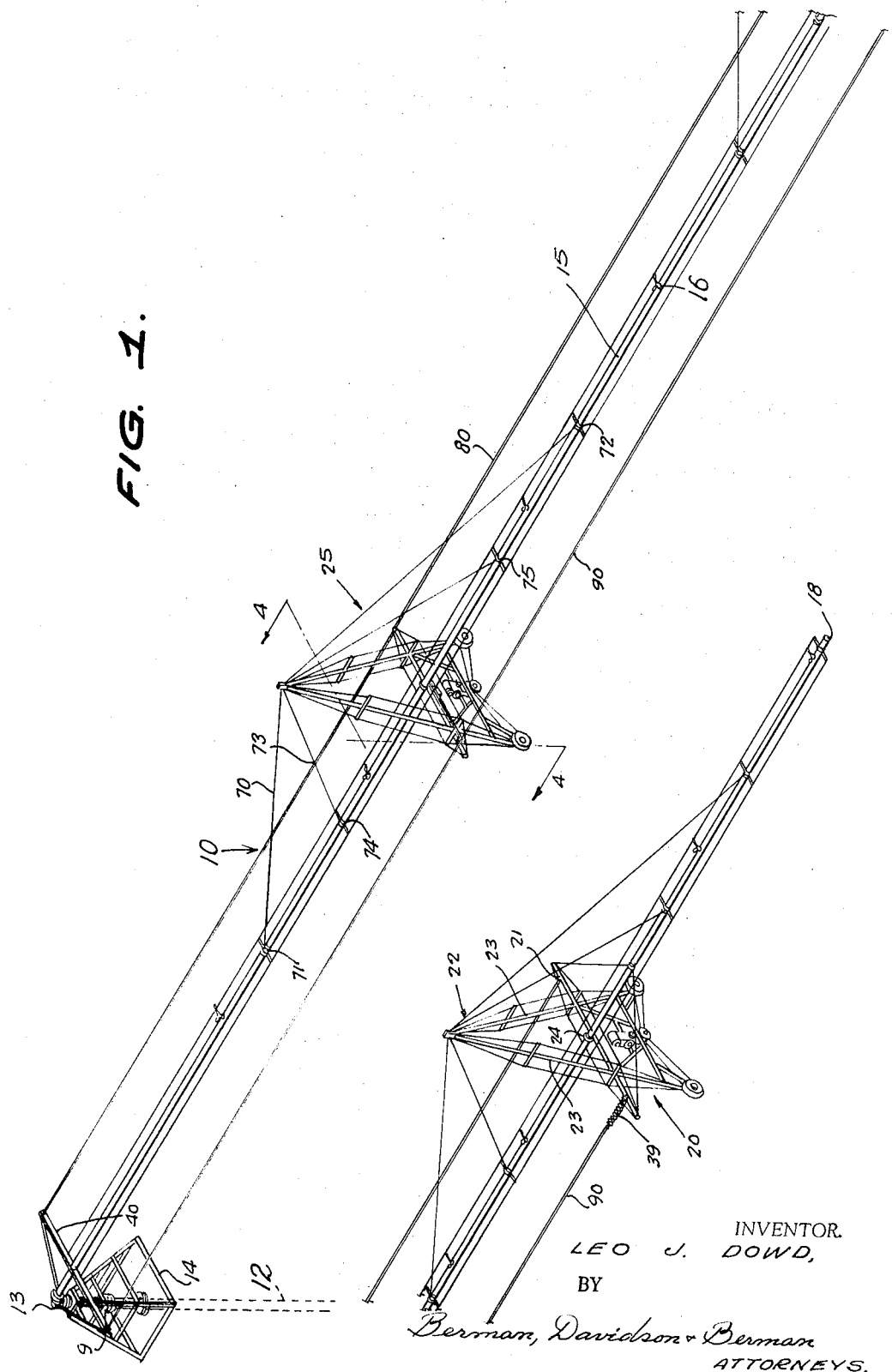

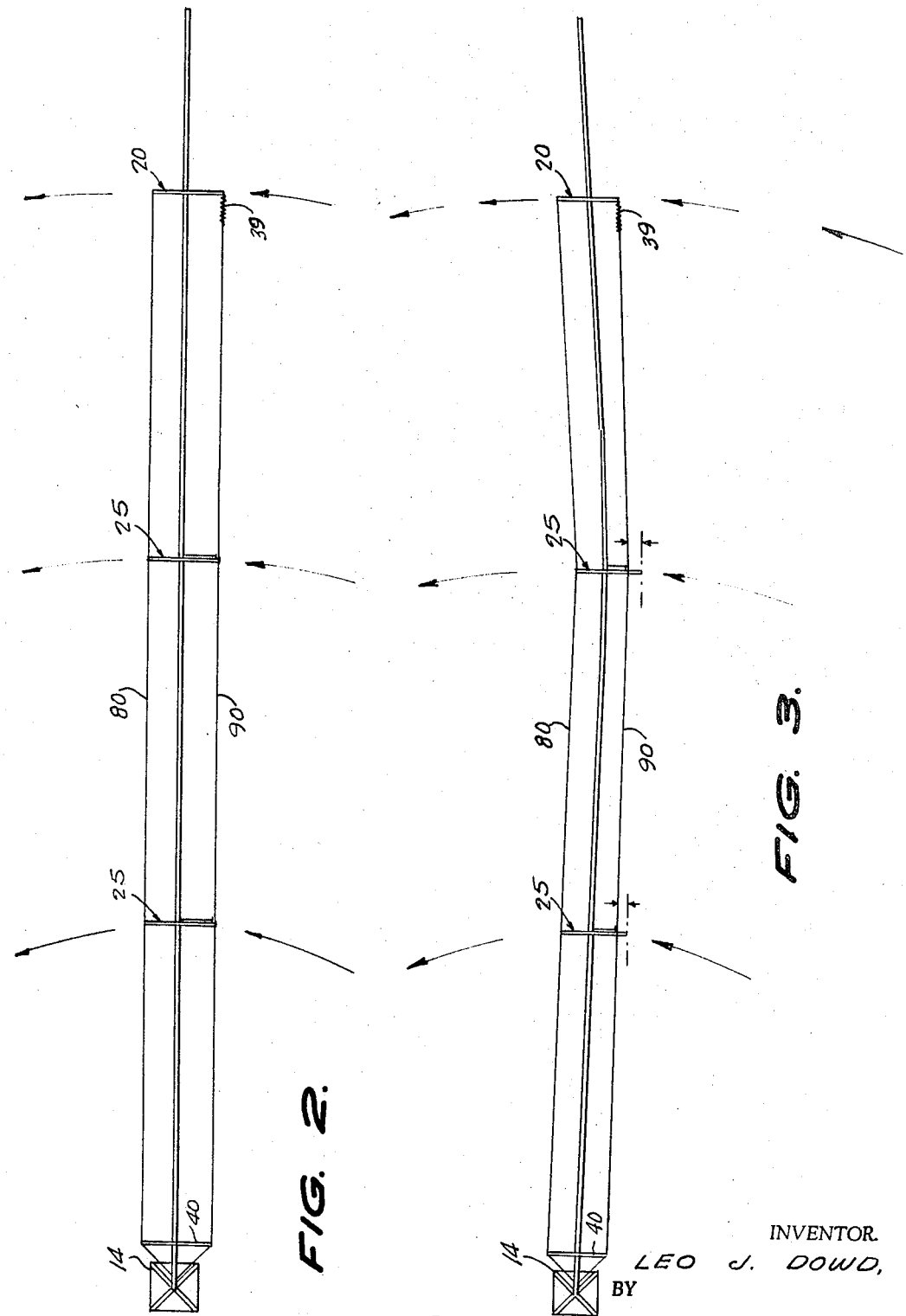

INVENTOR.
LEO J. DOWD,
BY
*Berman, Davidson & Berman*
ATTORNEYS.

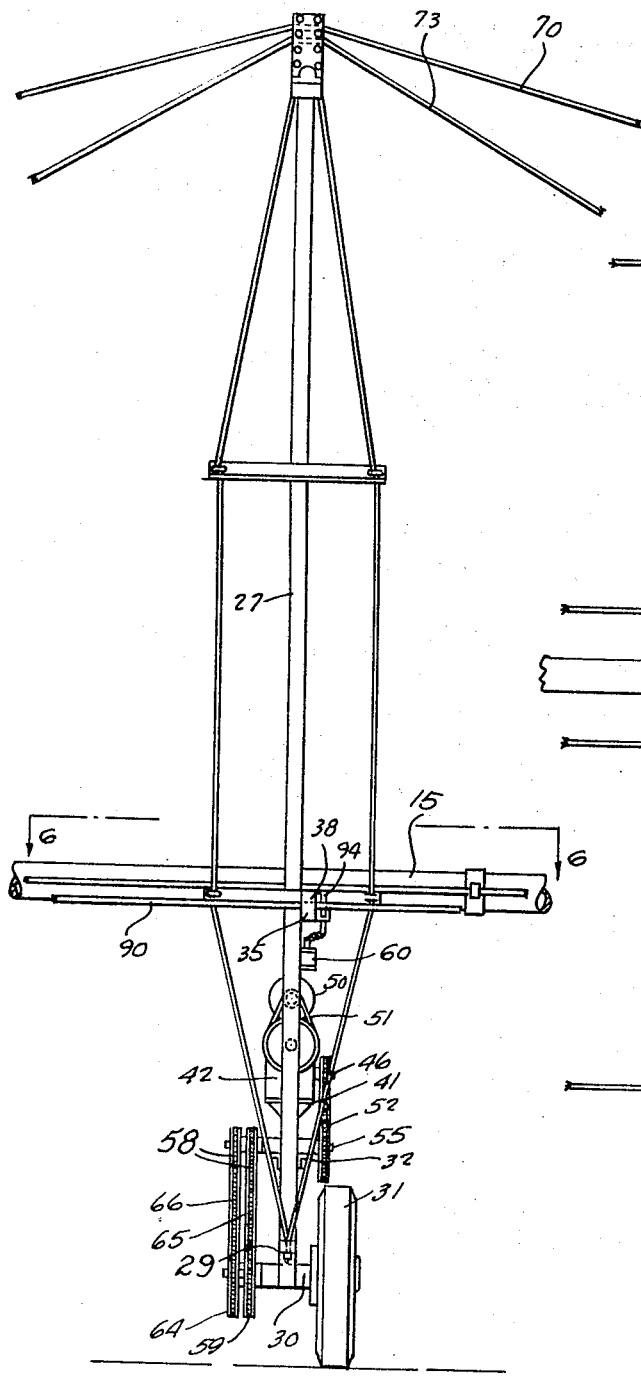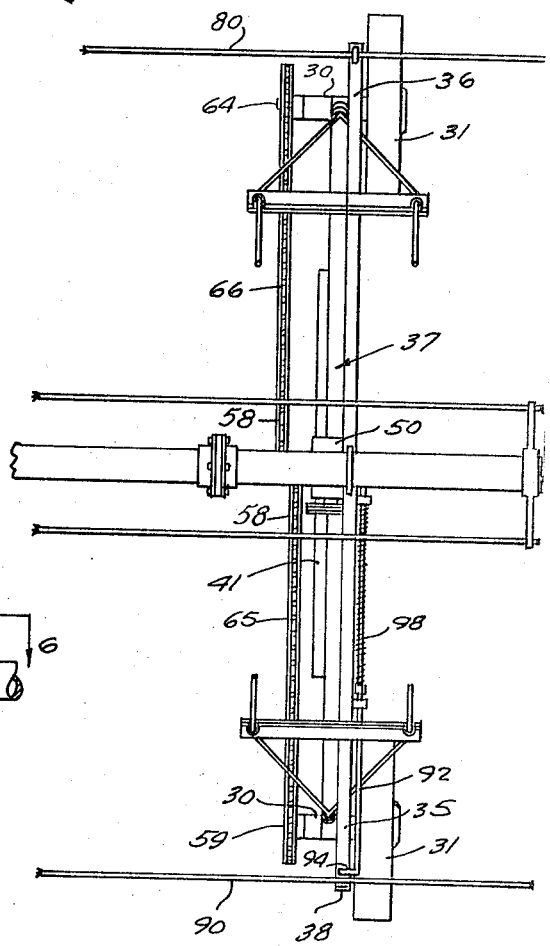

United States Patent Office 3,342,417
Patented Sept. 19, 1967

3,342,417
SELF-PROPELLED IRRIGATION SYSTEM OF THE
CABLE TYPE USING ELECTRIC MOTORS
Leo J. Dowd, 117 South Parkway,
Columbus, Nebr. 68601
Filed Aug. 6, 1965, Ser. No. 477,751
9 Claims. (Cl. 239—177)

ABSTRACT OF THE DISCLOSURE

A self-propelled irrigation apparatus of the type in which a water distributing pipe is revolved about one end as a pivot being carried by an outer mobile support and a plurality of intermediate mobile supports each driven over the ground to be sprayed by an individual electric motor, an elongated flexible cable member disposed on one side of and in parallel spaced relation to said distributing pipe and extending from said supply pipe to said main support, the ends of said cable being attached to the supply pipe and the main support, actuating means for said individual motors on each intermediate support forming a guide for longitudinal sliding movement of the cable and connected through a delay means to a switch on the corresponding motor, said cable upon bending being in bearing contact with said actuating means to shift the motor switch to energize the motor in accordance with lagging behind of the intermediate support, and said cable upon straightening being out of bearing contact with said actuating means to shift the motor switch to de-energize the motor in accordance with restoration of the intermediate support to a position of alignment with the main support.

This invention relates to a self-propelled irrigation apparatus of the cable type for watering a large tract of land.

An object of the invention is to provide a self-propelled irrigation apparatus wherein the water-distributing pipe is fixedly-supported on the constantly driven main mobile support and on each of the intermediate mobile supports and wherein the intermediate supports are each driven in response to its lagging behind of the main support and are each rendered inactive in response to the restoration to a position of alignment with the main support.

Another object of the invention is to provide a self-propelled irrigation apparatus wherein a control element on each of the intermediate mobile supports for the water-distributing pipe is operable, upon bearing contact with a flexible member, to energize the electric motor and activate its attendant drive means in accordance with lagging behind the constantly driven main mobile support, and is operable, upon release of bearing contact with said flexible member, to de-energize the electric motor and stop its attendant drive means in accordance with restoration of the intermediate support to a position of alignment with the main support.

A further object of the invention is to provide a self-propelled irrigation system which lends itself to ready installation on the plot of land to be irrigated, and which is highly efficient in action, and commercially feasible.

Other objects and advantages of the present invention will become apparent from the following description taken in conjunction with the accompanying drawings, in which:

FIGURE 1 is a perspective view, with parts broken away, of the self-propelled irrigating apparatus of the cable type according to the present invention.

FIGURE 2 is a diagrammatic showing of the self-propelled irrigating system of the present invention illustrating the main and intermediate mobile supports in position of alignment and rotational movements when in such position.

FIGURE 3 is a diagrmmatic showing of the assembly of FIGURE 2, but illustrating the rotational movements of the main and intermediate mobile supports, and the shifting of the position of the water-distributing pipe during lagging rotational movements of the mobile intermediate supports.

FIGURE 5 is a left-hand side elevational view of the assembly of FIGURE 4.

FIGURE 6 is a top sectional view taken on the line 6—6 of FIGURE 5.

Figure 4:
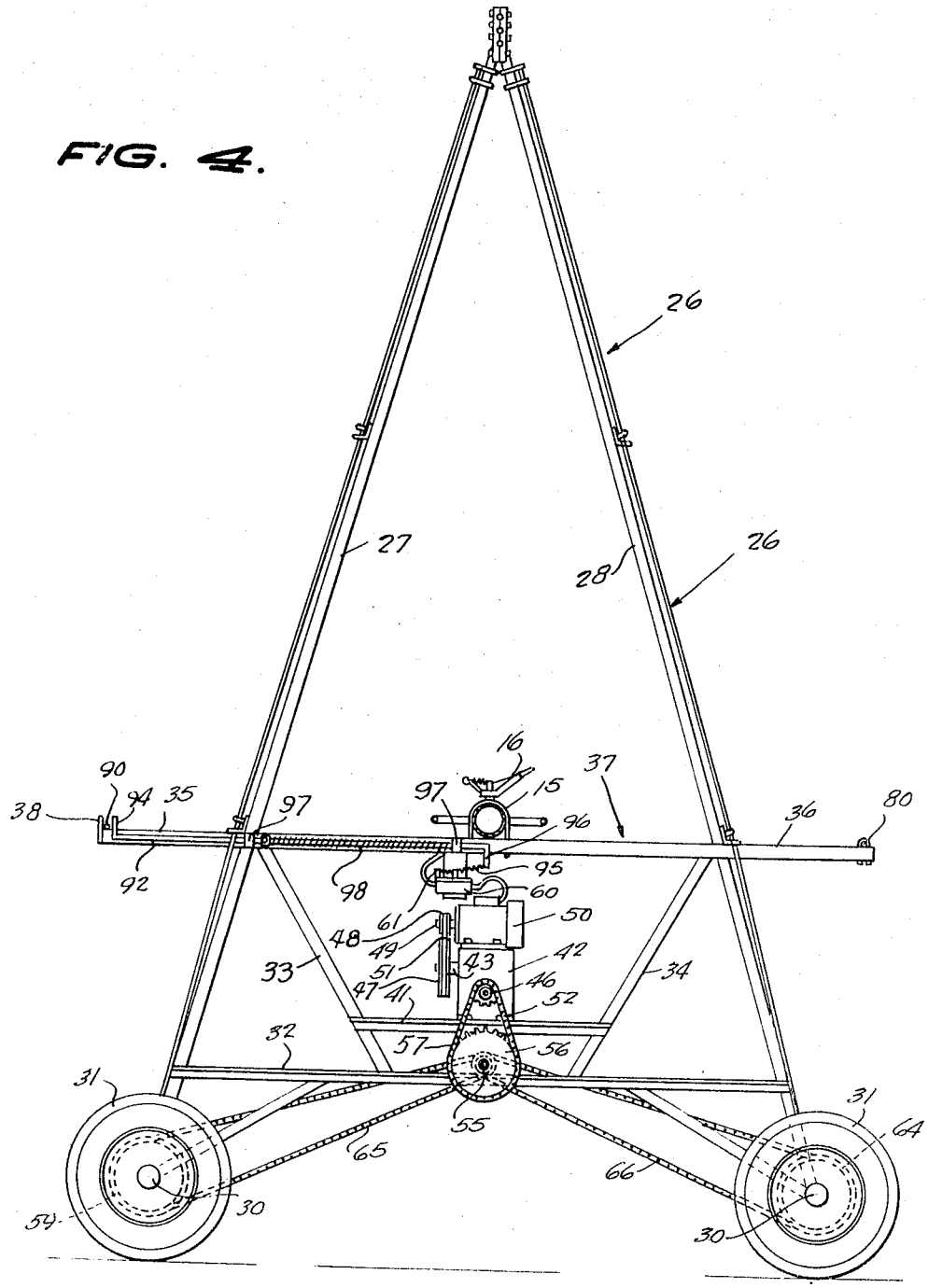
FIGURE 4 is a transverse elevational view taken on the line 4—4 of FIGURE 1.

Referring to the drawings, numeral 10 designates, generally, the self-propelled irrigation apparatus of the cable type according to the present invention. Such apparatus, FIGURE 1, comprises an upstanding water-supply pipe 12 which has its lower end submerged in a well containing water, not shown, the upper end of the pipe 12 being received in one arm of an elbow 13 which is supported in the top or apex of a pyramidal-shaped skeleton frame 14 resting upon the surface of the land above the well, the free end of the arm of the elbow 13 and the upper end of the pipe 12 being connected together by a rotary joint 9. An elongated horizontally-disposed water-distributing pipe 15 has one end fixedly-received in the other arm of the elbow 13. By virtue of the rotating joint 9, the distributing pipe 15 is pivotally-connected to the water-supply pipe 12 for movement of the distributing pipe 15 about the water-supply pipe 12 as an axis. The distributing pipe 15 is made up of a plurality of sections of pipe, the sections being fixedly-connected together in the conventional manner. It is to be noted that the connections of the respective pipe sections are such as to permit limited flexing of the pipe 15. As this forms no part of the invention, no further description appears necessary.

A plurality of discharge nozzles 16 are spaced along the distributing pipe 15 between its ends thereof and serve to spray water onto the land as the distributing pipe 15 moves about the supply pipe 12 as an axis.

It is to be noted that operatively-associated with the pipe 12 is a pump, not shown, for forcing the water from the well up through the supply pipe 12 and into and through the distributing pipe 15.

A main mobile support 20, FIGURE 1, is disposed transversely of the distributing pipe 15 adjacent the other end 18 thereof and fixedly-carries the distributing pipe 15, the pipe 15 being fixedly-secured to a horizontally-disposed strut 21 extending transversely across and secured to the legs 23 of an upstanding A-frame 22. Specifically, the pipe 15 is fixedly-secured to the strut 21 by means of an inverted U-shaped clamp 24.

It is to be noted that the main support 20 is constantly driven, and by virtue of its being so driven, effects the rotation of the distributing pipe 15 about the upstanding supply pipe 12 as an axis.

A plurality of intermediate mobile supports 25 are arranged transversely of and at spaced positions along the the distributing pipe 15 between the ends thereof. In FIGURE 1 only one of the supports 25 is shown, and in FIGURES 2 and 3, two of the supports 25 are shown between the main support 20 and the water-supply pipe 12. However, the number of intermediate supports 25 is variable, and depends upon the total length of the distributing pipe 15. If the total length of the distributing pipe 15 is about 1,300-feet, then the intermediate supports 25 should be located along the pipe 15 at about 20 or 30-feet spacing therebetween. However, the spacing of the intermediate supports 25 is optional.

On each of the intermediate supports 25 there is a means which fixedly-supports the adjacent portion of the distributing pipe 15. Since the construction of each of the intermediate supports is the same, only one of such supports will be specifically described. Referring to FIGURES 1 and 4, the support 25 includes an upstanding A-frame 26 which has the lower ends of its legs 27 and 28 secured to bosses 29, FIGURE 5, the bosses 29 having journaled therein stub shafts 30 carrying land-engaging wheels 31. The A-frame 26 has a base leg 32 which extends between the legs 27 and 28 adjacent the lower ends thereof and is secured to the legs 27 and 28, and braces 33 and 34 extend from the legs 27 and 28 to the base leg 32 and are secured to the legs 27 and 28 and base leg 32, respectively. An elongated strut 37 extends transversely across and is secured to the legs 27 and 28 of the A-frame 26 and is above and parallel to the base leg 32, the strut 37 having one end portion 35 projecting outwardly of the leg 27, and having the other end portion 36 projecting outwardly of the leg 28. On the one end of end portion 35 of the strut 37 is a stop 38, the purpose of which will subsequently become apparent.

The A-frame 26 of the intermediate support 25 carries an electric motor drive means for causing travel of the support over a land surface to be irrigated. On the A-frame 26 is a bracket 41 which extends from brace 33 to brace 34 and is fixedly-attached to the braces 33 and 34. On this bracket 41 is mounted a speed-reduction unit 42 and surmounting and operatively-connected to this unit 42 is an electric motor 50, the unit 42 being drivingly-connected to the land-engaging wheels 31.

The unit 42, FIGURES 4, 5 and 6, includes a driven shaft 43 which carries a worm in mesh with a gear, both invisible within the housing 42 on a driven shaft 43. The shaft 46 has an end portion projecting out of the side of the unit 42 and on such end portion is a pulley 47 which is drivingly-connected to a pulley 48 on the drive shaft 49 of an electric motor 50, surmounting the unit 42, by means of a drive belt 51. Operatively-connected to the motor 50 is a conventional switch 60, the switch being provided with a control element or switch-operating lever 61 for shifting the switch between closed and open positions. The control element or operating lever 61, as shown in FIGURE 4, is in closed position. The driven shaft 46 also has an end portion which projects out of the other or opposite side of the unit 42, and on this projecting end portion is a spur gear 52. The A-frame 26 of the intermediate support 25 has a main drive shaft 55 for driving the land-engaging wheels 31. The shaft 55 carries a gear 56 which is drivingly-connected to the spur gear 52 by means of a drive chain 57. The shaft 55 also carries a pair of like spur gears 58 which are arranged in side-by-side spaced relation as shown in FIGURE 5, one of the gears 58 being drivingly-connected to a gear 59 on one of the sub shafts 30 by means of a drive chain 65, and the other of the gears 58 being drivingly-connected to a gear 64 on the other of the stub shafts 30 by means of a drive chain 66.

The A-frame 22 of the main mobile supports 20, FIGURE 1, has an identical bracket carrying a speed-reduction unit and an electric motor operatively-connected thereto with drive means operatively-connecting the speed-reduction unit to the land-engaging wheels on the frame 22 as above-described in connection with the intermediate mobile support 25, except that the control element or switch-operating lever 61 is manually-operated to put the apparatus either into or out of operation, and not automatically-operated as in the case of the control element or switch-operating lever 61 on each of the intermediate supports 25.

A guy cable construction is provided for connecting the A-frame 22 of the main mobile support 20 and the A-frames 26 of the intermediate supports together and holding the respective supports in alignment. Such construction comprises a cable 70 having its mid-point stretched over and attached to the apex of the A-frame 22 of the main mobile support 20 and over that of each of the A-frames 26 of the intermediate mobile supports 25 with its ends fixedly-attached to the water-distributing pipe 15 as at 71 and 72, FIGURE 1, and a shorter cable 73 having its mid-point stretched over and attached to the apex of the A-frame 22 of the main mobile support 20 and over that of each of the A-frames 26 of the intermediate mobile support 25 with its ends fixedly-attached to the water-distributing pipe 15 as at 74 and 75.

An elongated flexible mamber or cable 80 serving as a guy is disposed on one side of and extends in parallel spaced relation along the distributing pipe 15 and has one end secured to a cross-member 40 on the distributing pipe 15 adjacent the skeleton frame 14, and has the other end secured to the strut 21 of the main mobile support 20. Another elongated flexible member or cable 90 serving as a guy is disposed on the opposite side of and extends in parallel spaced relation along the distributing pipe 15 and has one end secured to the cross-member 40 and has the other end secured to the free end of a coil spring 39, FIGURE 1, carried by the strut 21 of the main mobile support 20. This cable 90 has a further function other than serving as a guy, such function becoming subsequently apparent.

The control element or operating lever 61 of the motor 50 of each intermediate support 25 is operable to energize the motor 50 and activate its attendant drive means or reduction unit 42 in accordance with lagging behind of the intermediate support 25 and to de-energize the electric motor 50 and stop its attendan drive means or reduction unit 42 in accordance with restoration of the intermediate support 25 to a position of alignment with the main suppor 20. Specifically, actuating means is operatively-connected to the control element or operating lever 61 on each intermediate support 25, said means comprising, FIGURE 4, an elongated rod 92 provided at one end with an upstanding abutment 94, the rod 92 being positioned so as to extend longitudinally along the strut 37 of each intermediate support 25 with the abutment 94 inwardly of and adjacent to and spaced from the cable 90, and the other end of the rod 92 remote from the cable 90. The rod 92 is connected to the strut 37 for movement relative to he strut 37 as by spaced loops 97 projecing outwardly from the strut 37, as shown in FIGURE 4. Means connects the adjacent control element or switch-operating level 61 to the other end of the rod 92 for movement of the control element or lever 61 with the rod 92, said means embodying a coil spring 95 which has one end connected to the other end 96 of the rod 92 and has the other end attached to the control element or switch-operating lever 61. Spring means or a coil spring 98 is operatively-connected to the rod 92, FIGURE 4, the spring 98 serving to bias the rod 92 to the position in which its abutment 94 is spaced from the cable 90.

It is to be noted that the elongated flexible member or cable 90 is between the stops 38 on the struts 37 of the intermediate supports 25 and the abutments 94 of the rods 92 and extends slidably over the struts 37 of the intermediate supports 25. This cable 90 serves to operate the control elements or switch-operating levers 61 between closed and open positions. Each of the control elements or switch-operating levers 61 is operable, upon bearing contact with the cable 90, to energize the electric motor 50 and activate its attendant drive means or unit 42 in accordance with the lagging behind of the intermediate support and operable, upon release of bearing contact with the cable 90, to de-energize the electric motor 50 and stop its attendant drive means or unit 42 in accordance with restoration of the intermediate support 25 to a position of alignment with the main support 20.

In operation, with the pump in the supply pipe 12 in operation, the control element or switch-operating lever 61 on the main support 20 is shifted to close its switch to energize the electric motor and activate its attendant drive means, and constantly drive the main support 20. The constant driving of the main support 20 causes the distributing pipe 15 to rotate about the supply pipe 12 as an axis. As the distributing pipe 15 rotates, water is discharged from the nozzles 16 and distributed over and deposited upon the land underneath and thereby irrigates such land. Should an intermediate support 15 lag behind the main support 20, the cable 90 bears against the abutment 94 of the rod 92 to move the rod inwardly against the action of the spring 98, resulting in the shifting of the control element or switch-operating lever 61 to close the switch 60, to energize the electric motor 50, and activate its attendant drive means or reduction unit 42 and positively drive the intermediate support 25. The positive driving of the intermediate support 25 causes the latter support to move forwardly to a position of alignment with the main support 20, resulting in the shifting of the cable 90 out of bearing contact with the abutment 94, permitting the rod 92 to return to its initial position out of contact with the cable 90 under the action of the spring 98, and to return the control element or switch-operating lever 61 to open position and stop the activation of the drive means or speed-reduction unit 42.

What is claimed is:

1. A self-propelled irrigation apparatus comprising an upstanding water-supply pipe, an elongated horizontally-disposed water-distributing pipe having one end pivotally-connected to said supply pipe for movement of said distributing pipe about said supply pipe as an axis, a main mobile support disposed transversely of said distributing pipe adjacent the other end thereof and fixedly-carrying said distributing pipe, a plurality of discharge nozzles spaced along said distributing pipe between its ends thereof for spraying water onto the land as said distributing pipe moves about said supply pipe as an axis, a plurality of intermediate mobile supports arranged transversely of and at spaced positions along said distributing pipe, means on each intermediate support fixedly-carrying the adjacent portion of said distributing pipe, an electric motor drive means on each intermediate support, an elongated flexible member disposed on one side of and in parallel spaced relation with respect to said distributing pipe and extending from said supply pipe to said main support, the ends of said flexible member being attached to said supply pipe and said main support, a control element operatively-connected to the electric motor of each intermediate support and actuating means on each intermediate support forming a guide for longitudinal sliding movement of the flexible member with respect to each of said intermediate supports, said flexible member being operable, upon bending and bearing contact with said actuating means, to move said control element to energize the electric motor and activate its attendant drive means in accordance with lagging behind of the intermediate support and operable, upon straightening of the flexible member to release of bearing contact with said actuating means, to de-energize the electric motor and stop its attendant drive means in accordance wtih restoration of said intermediate support to a position of alignment with said main support.

2. The apparatus according to claim 1, which includes in addition an electric motor drive means on said main mobile support for effecting travel of said support over a land surface and thereby cause rotation of said distributing pipe about said supply pipe as an axis.

3. The apparatus according to claim 1, wherein a second elongated flexible member is added on the opposite side of and in parallel spaced relation with respect to said distributing pipe and extending from said supply pipe to said main support, the ends of said second flexible member being attached to said supply pipe and said main support, both of said flexible members being slidably connected to each of said intermediate supports and functioning as horizontal guides therefor.

4. The apparatus according to claim 3, wherein said first flexible member is attached to said main support by resilient means permitting limited elongation of the member under bending stress.

5. The self-propelled irrigation apparatus according to claim 1, wherein said flexible member comprises a cable.

6. The apparatus according to claim 5, wherein said means on each intermediate support fixedly-carrying the adjacent portion of said distributing pipe includes an upstanding frame rising from said support, a horizontally disposed strut transverse to said distributing pipe on said frame, and a clamp embracing the adjacent portion of said distributing pipe and secured to said strut, said actuating means comprising an elongated rod provided at one end with an upstanding abutment and being positioned so as to extend longitudinally along the strut of each intermediate support with the abutment inwardly of and adjacent to and spaced from said cable and the other end of the rod remote from said cable, said rod being connected to said strut for longitudinal movement relative to said strut, and means connecting the adjacent control element to said other end of said rod for delayed movement of the control element with said rod, said cable upon bending being in bearing contact against the abutment of said rod to shift the control element to energize the motor and activate its attendant drive means in accordance with lagging behind of the intermediate support and said cable upon straightening being out of bearing contact with the abutment of said rod to shift the control element to de-energize the electric motor and stop its attendant drive means in accordance with restoration of the intermediate support to a position of alignment with said main support.

7. The apparatus according to claim 6, wherein the means connecting the adjacent control element to the other end of said rod for delayed movement is a coil spring.

8. The apparatus according to claim 6, which includes in addition a spring means operatively-connected to the rod for biasing said rod to the position in which its abutment is spaced from said cable.

9. The apparatus according to claim 6, wherein said horizontally disposed strut on each intermediate support is formed at its outer end with a projecting stop, said flexible member being disposed between and spaced from said stops and said abutments on said rods whereby said struts, stops and abutments guidingly support said flexible member for longitudinal sliding movement.

References Cited

UNITED STATES PATENTS

| | | | |
|---|---|---|---|
| 1,966,783 | 7/1934 | Balaam | 239—212 |
| 2,604,359 | 7/1952 | Zybach | 239—177 |
| 2,711,615 | 6/1955 | Boice | 239—177 |
| 2,800,364 | 7/1957 | Dick et al. | 239—212 X |
| 2,893,643 | 7/1959 | Gordon | 239—177 X |
| 2,941,727 | 6/1960 | Zybach | 239—212 X |
| 3,001,721 | 9/1961 | Zybach | 239—177 |
| 3,281,080 | 10/1966 | Hogg | 239—212 |

M. HENSON WOOD, Jr., *Primary Examiner.*

VAN C. WILKS, *Assistant Examiner.*